Patented Oct. 29, 1935

2,018,661

UNITED STATES PATENT OFFICE 2,018,661

PROTECTIVE REAGENT FOR CELLULOSE MATERIAL

Wallace T. Conn, Lawrence, Mass., assignor to the Government of the United States, represented by the Secretary of Commerce No Drawing. Application November 7, 1932, Serial No. 641,618

2 Claims. (Cl. 134—13)

(Granted under the act of March 3, 1883, as amended April 30, 1928; 370 O. G. 757)

The invention described herein may be manufactured and used by or for the Government of the United States for governmental purposes without the payment to me of any royalty thereon.

This invention relates to a process for conserving bituminous material designed more particularly to preserve the original qualities of oxidizable or organic substances such as vegetable fibers and their products.

It is recognized that the chemical rays of the sun promotes growth and plant life, and it is also known, though not so generally understood, that sun rays cause deterioration of these products when the growing or life period ceases. Oxidation or deterioration by sun rays or other forces of nature also occurs in oxidizable or organic substances other than cellulose or vegetable products.

Deterioration by oxidation of organic material may be retarded by the application of certain chemicals known as antioxidants to the organic substance and likewise antioxidants applied to oxidizable material retards deterioration. The effect of these chemicals, however, is limited and uncertain when applied to a tar like substance if the antioxidant is not in complete solution.

I have found that a minute dissemination of an antioxidant, having the characteristics of a chemical deterrent which will protect bituminous material from deterioration, throughout the bituminous substance is necessary to protect the material. For example, I have discovered that an antioxidant such as oil soluble "Anti-Oxidant Number 10" possesses the requisite characteristic properties and when it is dissolved in tar or similar bitumen substances the resulting mixture or antioxidized substance has improved flexibility and resists deterioration normally caused by the destructive forces of nature.

"Anti-Oxidant No. 10" is an oil soluble residue resulting from the reaction of alpha naphthylamine with acetaldol.

Much roofing material, either in the form of rolled stock or shingles, is composed of cellulose material or organic substance saturated, covered or impregnated with a bituminous substance or mixture. When the latter contains a soluble antioxidant, increased service of the commercial product is obtained through retardation of the soluble constituents of the bitumen and therefore hardening is prevented and generally, deterioration by the destructive forces of nature is retarded.

Bituminous substances used in road construction, when containing a soluble antioxidant, maintains flexibility through retardation of the soluble constituents of the bitumen and therefore the life and service is prolonged as compared to the same bituminous substance without a soluble antioxidant.

In my co-pending application, Serial Number 624,139, I have disclosed a process for protecting treated cellulose material by means of a cover treatment such as tar carrying certain antioxidants.

Similarly, when antioxidzed bituminous preservatives are applied to marine cordage, fish nets, or fibrous and cellulose materials and the like, increased flexibility and resistance to deteriorating forces results, whereby the tensile strength is maintained.

The efficacy of my process depends largely upon the composition of materials most suitable for the article or substance to be treated and while the foregoing description comprehends only general and preferred embodiments of my invention, any detail changes in the process, method, composition and uses may be made within the scope of my invention as set forth in the appended claims.

Having thus described my invention, what I claim is—

1. A protective reagent for cellulose material comprising tar and an oil soluble residue resulting from the reaction of alpha naphthylamine with acetaldol.

2. A composition of material including a tar-like substance and an oil soluble residue resulting from the reaction of alpha naphthylamine with acetaldol.

WALLACE T. CONN.